Oct. 19, 1965   W. L. ULLMAN ETAL   3,212,529
COLLAPSIBLE DUCT SECTION
Filed Dec. 11, 1961   2 Sheets-Sheet 1

WILLIAM L. ULLMAN &
HENRY N. MARSH, JR.
INVENTORS

BY
ATTORNEYS

Oct. 19, 1965

W. L. ULLMAN ETAL 3,212,529

COLLAPSIBLE DUCT SECTION

Filed Dec. 11, 1961

WILLIAM L. ULLMAN &
HENRY N. MARSH, JR.
INVENTORS

BY
ATTORNEYS

United States Patent Office 3,212,529
Patented Oct. 19, 1965

3,212,529
COLLAPSIBLE DUCT SECTION
William L. Ullman and Henry N. Marsh, Jr., Granville, Ohio, assignors to Owens-Corning Fiberglas Corporation, a corporation of Delaware
Filed Dec. 11, 1961, Ser. No. 158,315
3 Claims. (Cl. 138—141)

The present invention relates to a prefabricated duct section that may be readily crushed or deformed into a compact package having a small volume for shipment, and more particularly to a polygonal cross sectional duct or conduit structure composed of a fibrous material having sufficient flexibility and resiliency to return to its predetermined polygonal configuration when the restraining forces maintaining each duct section in a collapsed state are removed.

Prefabricated conduit structures are used for conducting air in buildings, and this air is customarily conditioned for various heat, cold and comfort requirements thereby necessitating the insulation of the air in the conduit structure from the remainder of the building space. One type of air duct section is manufactured from sheet metal in a fabricating plant, and an insulating coating, such as a glass wool, is applied after the duct sections are shipped to the building and installed. Many of such ducts also require liners. Such sections are bulky to handle and expensive to transport because of the large volume occupied while the subsequently applied coating may not effectively insulate the air transmitted therethrough. The prefabrication of the duct sections from insulating material has not solved the expensive shipping problem.

It has also been proposed to use a flat blank in the form of a fibrous board that is faced on both surfaces. Such a blank is prescored to form fold lines and is readily shipped to the work site where it is folded into a duct section. While such ducts reduce the shipping costs, the fabrication of duct sections from blanks at the work site may be time consuming and may even require special tools.

It is, therefore, an object of the present invention to provide a prefabricated duct section that is economically manufactured and readily shipped.

Another object of the invention is to provide a duct section having a polygonal cross section which may be collapsed into a minimum volume for shipment, and which readily returns to its polygonal configuration in a released state.

A still further object of the invention is to provide a duct for the transmission of conditioned air that is highly resilient and has excellent acoustical properties.

Other objects and advantages of the invention will be apparent from the description which follows and from the drawings in which like numbers are used throughout to identify like parts.

In order to achieve the above objects there is provided a duct section that is prefabricated from a blank consisting of a layer of medium density fibrous glass wool adhered to a layer of facing material by folding the blank along scored V-shaped notches and joining the mating edges. Because of the resiliency of the fibrous glass wool the completed duct section can be collapsed into a rather flat configuration, and the duct section will spring back into its desired folded shape upon release of the collapsing force.

Figure 1:
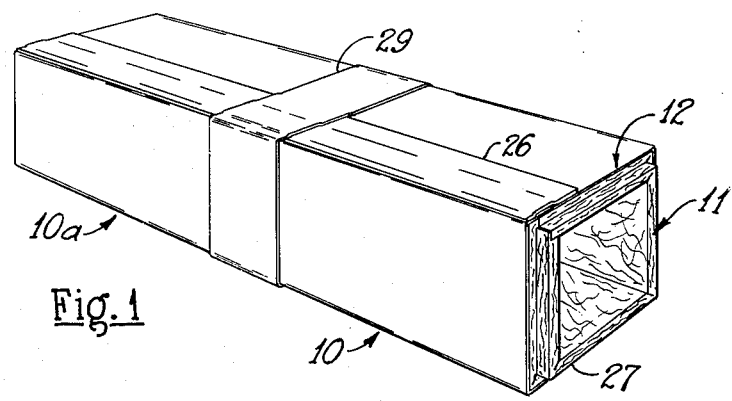
FIG. 1 is a perspective view of an air duct or conduit constructed in accordance with the invention and includes a pair of duct sections joined together.

Referring now to the drawings, a conduit structure including duct sections 10 and 10a constructed in accordance with the invention is shown in FIG. 1. The specific duct section illustrated in the drawings comprises a heat and acoustical insulating layer 11 of fibrous glass wool adhered to a composite facing layer 12 that is abuse resistant and flame retarding. The duct section 10 has a rectangular cross section and is formed by suitably folding a flat blank, as shown in detail in FIGS. 2, 3 and 4, into the configuration shown in FIG. 1.

The fibrous glass wool layer 11 is extremely resilient and has long fibers for the necessary strength to withstand the bending and crushing during shipping. The glass fibers in the wool layer 11 have average diameters in the range of about 15 to 35 hundred-thousandths of an inch. For best results fibers having an average diameter of about 30 hundred-thousandths of an inch are preferred. The fibers are bonded together with a thermosetting resin, preferably phenol formaldehyde, which is distributed uniformly throughout the body of the wool in amounts ranging from about 10% to 16% by weight of the wool. The fibrous material with resinous binder distributed therethrough is held to a density of approximately 2 to 4½ pounds per cubic foot, and extremely good results are obtained with fibrous glass wool having a density of 3.3 pounds per cubic foot.

Figure 4:
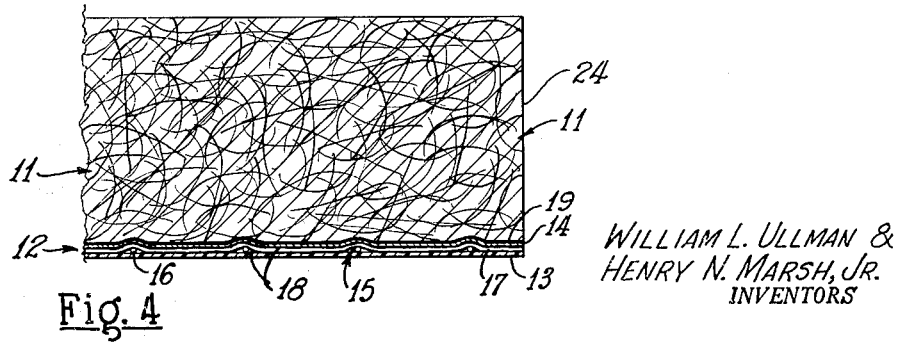
FIG. 4 is a view in vertical section along the line 4—4 in FIG. 2.

Referring particularly to FIG. 4, the facing layer 12 is a laminate of an exposed sheet 13 adhered to a vapor barrier sheet 14 with glass scrim 15 interposed therebetween. The exposed sheet 13 may be any suitable material such as embossed kraft paper or rigid vinyl having a thickness of approximately two mils, while the vapor barrier layer 14 is preferably aluminum foil. The aluminum foil preferably has a thickness of .7 mil when used with kraft paper and a thickness of 1 mil when used with vinyl. The scrim 15 comprises parallel glass strands 16 and parallel glass strands 17 disposed at right angles to the strands 16 for maximum strength and puncture resistance.

The exposed sheet 13, the vapor barrier sheet 14, and the scrim 15 are laminated into a sandwich structure and held in relative position by a suitable adhesive material 18. While the adhesive material 18 is preferably flame retardant and produces a gas when subjected to fire which tends to retard the spread of flame along the surface of the duct, other conventional adhesive materials may be utilized. The resulting facing layer 12 is adhered to the fibrous glass wool 11 by a similar adhesive material 19 on the vapor barrier layer 14, and the adhesive material 19 likewise is preferably of the flame retardant type which will maintain adherence between the facing layer 12 and the wool layer 11 when the duct is carrying air at 250° F.

Figure 2:
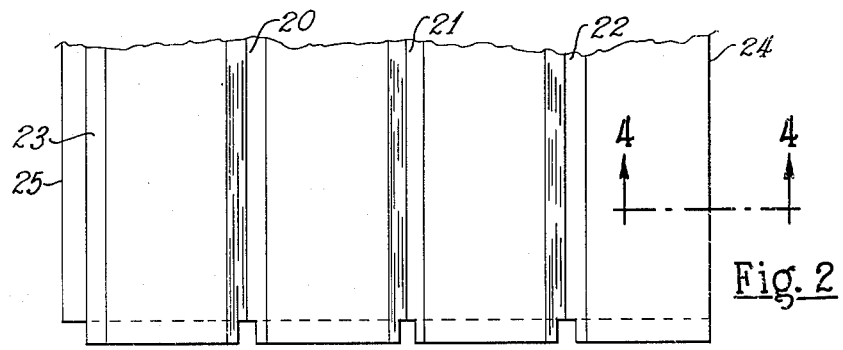
FIG. 2 is a plan view of a blank made according to the invention that is foldable into one of the duct sections shown in FIG. 1.
Figure 3:
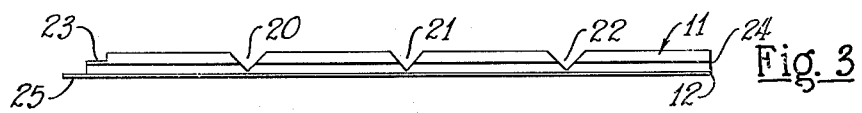
FIG. 3 is a view in vertical elevation of the blank of FIG. 2.
Figure 5:
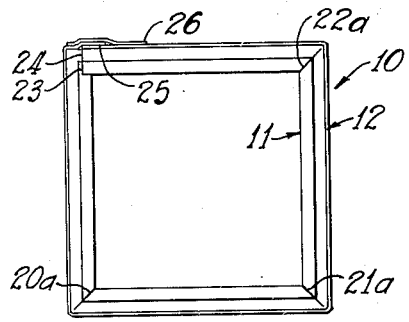
FIG. 5 is an end view in elevation of one of the duct sections shown in FIG. 1 in its unrestrained condition.

Referring now to FIGS. 2 and 3, three generally V-shaped cuts 20, 21 and 22 are provided in the fibrous glass wool layer 11 to enable the blank to be folded from a flattened condition shown in FIGS. 2 and 3 into the configuration of the duct shown in FIG. 1. When the blank is folded to form the duct section 10, a joint is formed between a longitudinaly extending offset 23 and an opposed longitudinal edge 24 of the blank. The offset 23 is formed by removing a portion of the wool layer 11 having a width equal to the thickness of the layer 11 as illustrated in FIG. 5.

A sealing flap 25 integral with the facing layer 12 is formed by a sheet of the laminated facing material that is somewhat wider than the fibrous glass wool layer 11 on the flat blank as shown in FIGS. 2 and 3, and the flap 25 is secured to the portion of the duct section 10 which it overlaps by cementing or stapling. The joint is further strengthened by covering the flap 25 with a reinforcing strip 26 that is adhered to both the flap 25 and the portion of the exposed sheet 13 adjacent thereto. The reinforcing strip 26 is a tape that is impregnated with plaster of Paris, and the tape is of the type which contains plaster of Paris that becomes activated when dipped in water. The reinforcing strip 26 is formed by sequentially spreading two wetted lengths of this tape over the flap 25.

Figure 7:
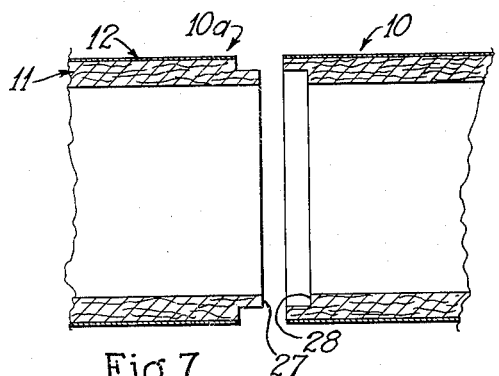
FIG. 7 is a sectional view of the duct section shown in FIG. 1 showing the method of attachment.

Each duct section 10 and 10a is provided with a protrusion 27 extending from one end and a recess 28 extending into the opposite end. The duct or conduit shown in FIG. 1 is constructed by inserting the protrusion 27 of the duct section 10a into the recess 28 of the duct section 10 in the manner shown in FIG. 7 to form a shiplap joint. A sealing strip 29 is adhered to the outer surfaces of both the duct sections 10 and 10a adjacent the shiplap joint as shown in FIG. 1 to prevent escape of air from the duct and to strengthen the assembly. The sealing strip 29 preferably comprises three strips of a plaster of Paris tape of the type used in the reinforcing strip 26. A duct so constructed from a blank having a one inch thick insulating layer 11 is sufficiently strong for its intended use under a static gauge pressure of two inches of water.

The problem of fiber erosion at the interior surfaces of the duct is solved without applying any additional material to the inner surface of the insulation layer 11. The facing layer 12 is applied to the surface of the self-sustaining fibrous glass wool that is on top as the wool is conveyed by a forming chain from the curing oven wherein the binder is heated because a rather stiff film of cured binder is formed on the bottom surface of the wool adjacent the forming chain. This film is caused by the leaching of the binder during the production of the raw fibrous glass wool and by binder migration in the curing oven. This concentration of binder on the inner surface of the duct securely binds the innermost fibers to the wool pack and prevents fiber erosion even at velocities of 7000 feet per minute.

When the blank shown in FIGS. 2 and 3 is folded with the flap 25 secured to the outer surface of the exposed sheet 13 and the reinforcing strip 26 is applied thereto, the completed duct section 10 has a generally rectangular cross section as illustrated in FIG. 5, and in many installations the cross section of the duct is preferably square. The sides of the cuts 20, 21 and 22 of FIGS. 2 and 3 contact each other to form fold lines 20a, 21a and 22a respectively as shown in FIG. 5.

Figure 6:
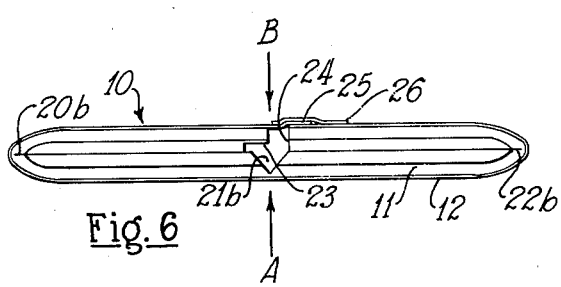
FIG. 6 is an end view in elevation of one of the duct sections shown in FIG. 1 in its collapsed state for shipment.

When it is desired to reduce the volume occupied by the duct section 10 for shipping, inwardly directed forces are applied to diagonally opposed corners of the duct section 10 as illustrated by the arrows A and B in FIG. 6 to collapse the duct section. One of the forces (arrow B) is preferably applied to the corner formed by the abutment of the edge 24 with the offset 23 so that this joint opens in the manner illustrated in FIG. 6. When the duct 10 is collapsed the fold lines 20a and 22a of FIG. 5 become elongated as indicated at 20b and 22b in FIG. 6 because the glass fibrous wool adjacent these fold lines is compressed while the fold line 21a opens into a groove 21b opposite the opened joint between the offset 23 and the edge 24. A plurality of collapsed duct sections may be banded together or boxed for shipment in a comparatively small space.

After the retaining or folding forces (arrows A and B) are removed at the work site, each duct section springs open because of the resiliency of the insulating layer 11, especially the portions of this layer adjacent to and on opposite sides of the elongated fold lines 20b and 22b in FIG. 6. It is important that each duct section return from the flattened configuration of FIG. 6 to the original folded shape shown in FIG. 5 with the rectangular cross section for easy assembly with other sections in the manner shown in FIGS. 1 and 7 to form the completed installation. The return of the collapsed duct to its predetermined shape is achieved by providing not only a highly resilient insulating layer 11 of glass fibers that is self sustaining but also proper configurations for the parallel cuts 20, 21 and 22 in the blank.

The corner of the duct section 10 formed by the abutment of the offset 23 with the edge 24 is considerably weaker than the remaining corners adjacent the fold lines 20a, 21a and 22a of FIG. 5 because the forces exerted between the glass fibers in the offset 23 and the adjacent fibers in the edge 24 are much smaller than those exerted by the glass fibers in the areas immediately adjacent the fold lines 20a, 21a and 22a. Consequently, if the cuts 20, 21 and 22 shown in FIGS. 2 and 3 had the same configuration, i.e., depth and included angle, the duct section 10 would tend to lean toward the joint formed by the offset 23 and the edge 24 because the combined forces of the compressed glass fibers in the insulating layer 11 adjacent the fold lines 20a and 22a which tend to open these fold lines would exceed the corresponding forces at the fold line 21a, and such a duct section would have a cross sectional configuration in the form of a rhomboid. This problem is solved by removing a smaller amount of fibrous glass wool from the cut 21 so that the restoring forces in the area of the fold line 21a is equal the combined restoring forces in the areas of the fold lines 20a and 22a.

More particularly the included angle of the cuts 20 and 22 is about 90 degrees while the included angle of the cut 21 is less than 90 degrees, being preferably about 84 degrees 50 minutes. It has been found that if the included angle of the cut 21 is made excessively small, for example, about 70 degrees, the resulting duct section would lean in the opposite direction to form a rhomboid configuration because of the excessive restoring forces in the resilient wool layer adjacent the fold line 21a.

The cuts 20, 21 and 22 extend only partially through the self sustaining insulating layer 11, and a portion of the fibrous glass wool in the layer 11 adjacent the facing layer 12 remains intact. For example, in a prefabricated duct section 10 wherein the glass fibrous wool insulating layer 11 preferably has a thickness of one inch, the cuts 20, 21 and 22 extend to a depth of approximately ⅞ inch thereby leaving a ⅛ inch thickness of the insulating layer 11 intact. The presecene of this fibrous glass material adjacent the facing layer 12 not only reinforces the corners of the duct adjacent the fold lines 20a, 21a and 22a but also provides a margin of safety for the fabricator when making the parallel cuts 20, 21 and 22 by passing knives with edges sharpened to the proper angle along the insulating layer 11.

Figure 8:
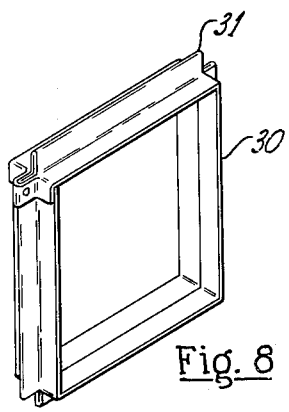
FIG. 8 is a perspective view of a reinforcing insert for strengthening and longitudinally reinforcing the joined duct sections.
Figure 9:
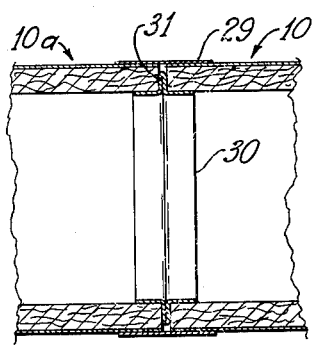
FIG. 9 is a sectional view showing the reinforcing insert of FIG. 8 in assembled position.

Referring now to FIGS. 8 and 9 there is shown a reinforcing insert 30 which is used with large duct sections indicated at 10b and 10c that are joined by a butt joint instead of a shiplap joint. An insert 30 is positioned as shown in FIG. 9 to align the duct sections 10b and 10c at assembly and to provide additional compressive strength. Each of the inserts 30 has a rectangular configuration identical with that of the duct sections, and the outside dimensions of the insert 30 are substantially the same as the inside dimensions of the duct sections. The insert 30 is preferably metal and may be easily fabricated from standard galvanized iron T bars. An outwardly extending flange 31 is located substantially at the midpoint of the insert 30 and extends outwardly from the entire peripheral surface thereof. As shown in FIG. 9, the flange 31 has a height less than the thickness of each duct section, i.e., approximately ¾ inch, and at assembly the flange 31 engages the end edges of both duct sections 10 and 10a.

While the preferred embodiment of the invention has been shown and described, various modifications may be made to the disclosed structure without departing from the spirit of the invention or the scope of the subjoined claims. For example, while a duct section having a rectangular cross section has been shown, ducts having other polygonal cross sections may be constructed in accordance with the invention.

We claim:

1. A duct section having a polygonal configuration of an even number of sides, comprising a layer of strong puncture resistant flexible material on the outside of said section, and a layer of self-sustaining glass fibers on the inside of said section, said section having been made from a generally flat fiber glass board material having $n$ V-shaped grooves therein which open outwardly away from said flexible material, the side walls of alternate ones of said grooves forming an angle of substantially 360° divided by $n+1$ and the side walls of intermediate ones of said grooves forming an angle slightly less than 360° divided by $n+1$, said grooves terminating short of the internal surface of the flexible material, said glass fibers being randomly oriented and being bonded to one another by normally substantially non-deformable thermoset resin particles at areas of contact between said fibers, but substantially devoid of the resin intermediate said areas of contact, said resin comprising from about 10 percent to about 16 percent by weight of the board material and said board material having an apparent density in the range of about 2 to about 4½ pounds per cubic foot, a major portion of said glass fibers having diameters sufficiently small, relative to the content of thermoset resin particles in the board material, that the resilence of said glass fiber layer tends to restore said section to said polygonal configuration when said section is collapsed.

2. A duct section having an even number of sides made from a generally flat fiber glass board material having a generally stretch resistant backing, said board material having $n$ V-shaped grooves therein which open outwardly away from said backing, the side walls of alternate ones of said grooves forming an angle of substantially 360° divided by $n+1$ and the side walls of intermediate ones of said grooves forming an angle slightly less than 360° divided by $n+1$, said grooves terminating short of the internal surface of the backing, and said duct being formed by folding said board until the sides of said V-shaped grooves abut each other, said board material being made from glass fibers which are randomly arranged into a mat and in which the individual fibers are bonded to one another by normally substantially non-deformable thermoset resin particles at areas of contact between said fibers, but are substantially devoid of the resin intermediate said areas of said contact, said resin comprising from about 10 percent to about 16 percent by weight of the board material, and said mat being compacted to an apparent density in the range between 2 and 4½ pounds per cubic foot, and said fibers having diameters sufficiently small, relative to the content of thermoset resin particles in the board material, that the sections of said duct on opposite sides of a V-shaped groove can be folded against each other by resiliently compressing the area of the board material adjacent the side walls of said V-shaped grooves without permanently crushing the board material.

3. A rectangularly shaped duct constructed in accordance with claim 2 wherein said fiber glass board material has three V-shaped grooves, the side walls of one of said grooves forming an angle of about 84° 50 minutes and the side walls of the other two grooves forming angles of approximately 90°.

References Cited by the Examiner

UNITED STATES PATENTS

| 1,147,650 | 7/15 | Scudder | 229—14 |
|---|---|---|---|
| 1,916,908 | 7/33 | Stacey et al. | |
| 1,959,426 | 5/34 | Henderson. | |
| 2,108,159 | 2/38 | Barman. | |
| 2,148,454 | 2/39 | Gerard | 229—14 |
| 2,173,871 | 9/39 | Zalkind | 229—14 |
| 2,231,982 | 2/41 | Zalkind | 229—14 |
| 2,371,556 | 3/45 | Steffens et al. | 138—119 XR |
| 2,378,272 | 6/45 | Whitaker | 138—161 |
| 2,525,644 | 10/50 | Brunson | 138—141 XR |
| 2,830,000 | 4/58 | Labino | 154—44.15 |
| 2,858,970 | 11/58 | Barnes et al. | |
| 2,870,793 | 1/59 | Bailey | 138—141 |
| 2,890,739 | 6/59 | Haines | 154—44 |
| 2,990,307 | 6/61 | Stalego. | |
| 3,009,601 | 11/61 | Matsch. | |

OTHER REFERENCES

"Fiberglass Insulation for Industrial Uses," Owens-Illinois Glass Company, Toledo, Ohio, January 1939, page 2 relied on, copy in Group 360.

LEWIS J. LENNY, *Primary Examiner.*

EDWARD V. BENHAM, *Examiner.*